United States Patent [19]

Kinder

[11] Patent Number: 5,673,854
[45] Date of Patent: Oct. 7, 1997

[54] FOLDABLE SPRAYING SYSTEM

[76] Inventor: Leon Kinder, Rte. 6, Box 2310, Paris, Tex. 75462

[21] Appl. No.: 442,331

[22] Filed: May 16, 1995

[51] Int. Cl.$^6$ ........................................ B05B 1/20
[52] U.S. Cl. ............................. 239/164; 239/166
[58] Field of Search ........................... 239/1, 104, 164, 239/166, 157; 56/1, 10.2 E; 47/1.7

[56] References Cited

U.S. PATENT DOCUMENTS

| | | | |
|---|---|---|---|
| 1,028,288 | 6/1912 | Schoentag et al. | |
| 2,475,686 | 7/1949 | Anderson | 222/177 |
| 2,551,870 | 5/1951 | Bridger, Jr. | 97/199 |
| 2,581,678 | 1/1952 | Malin et al. | 299/47 |
| 2,637,594 | 5/1953 | Spedding | 299/30 |
| 2,740,664 | 4/1956 | Yates | 299/45 |
| 2,977,715 | 4/1961 | Lindsay | 47/1.7 |
| 3,118,607 | 1/1964 | Rocher | 239/104 |
| 3,202,359 | 8/1965 | Gill, Jr. | 239/1 |
| 3,512,714 | 5/1970 | Phelps et al. | 239/168 |
| 3,540,632 | 11/1970 | Clingun | 222/178 |
| 3,601,314 | 8/1971 | Hurt | 239/157 |
| 3,792,814 | 2/1974 | Platz | 239/149 |
| 3,796,353 | 3/1974 | Smrt | 222/176 |
| 3,802,172 | 4/1974 | Mathews | 56/15.8 |
| 3,998,387 | 12/1976 | Maasberg | 239/102 |
| 4,015,855 | 4/1977 | Murray | 280/415 A |
| 4,023,507 | 5/1977 | van der Lely | 111/6 |
| 4,186,879 | 2/1980 | Kinder | 239/177 |
| 4,353,505 | 10/1982 | Kinder | 239/167 |
| 4,646,971 | 3/1987 | Rogers | 239/166 |

OTHER PUBLICATIONS

'95–'96 Custom Ag Products, Inc. Catalog, Benson, Minnesota, 1995.
Foldout Brochure by Rogers Innovative Inc., Saskatoon, Sask. Canada, "Driftproof Spray Applicators", 1989.
Brochure by Kleco, Denton, Texas (no title).

Primary Examiner—Robert J. Oberleitner
Assistant Examiner—Pamela J. Lipka
Attorney, Agent, or Firm—Jenkens & Gilchrist, a Professional Corporation

[57] ABSTRACT

A bottomless, rectangular, elongated box type housing has a center section, a first outer section, and a second outer section. The center section is attached to a first section of the first outer section and a first section of the second outer section by hinges, which permit the first outer section and the second outer section to rotate rearwardly in a horizontal plane. A pin passes through apertures in gussets on the center section and the first section, thereby securing the first outer section in a forwardly extended position. Likewise, a pin passes through apertures in gussets on the center section and the second outer section, thereby holding the second outer section in a forwardly extended position. A hinge permits a second section of the first outer section to pivot vertically relative to the first section of the first outer section. Likewise, a hinge permits a second section of the second outer section to pivot vertically relative to the first section of the second outer section. A carriage has a hitch attached to the forward portion of a frame, and a wheel assembly attached to the rear portion of the frame. The center section of the housing attaches to the frame of the carriage.

30 Claims, 5 Drawing Sheets

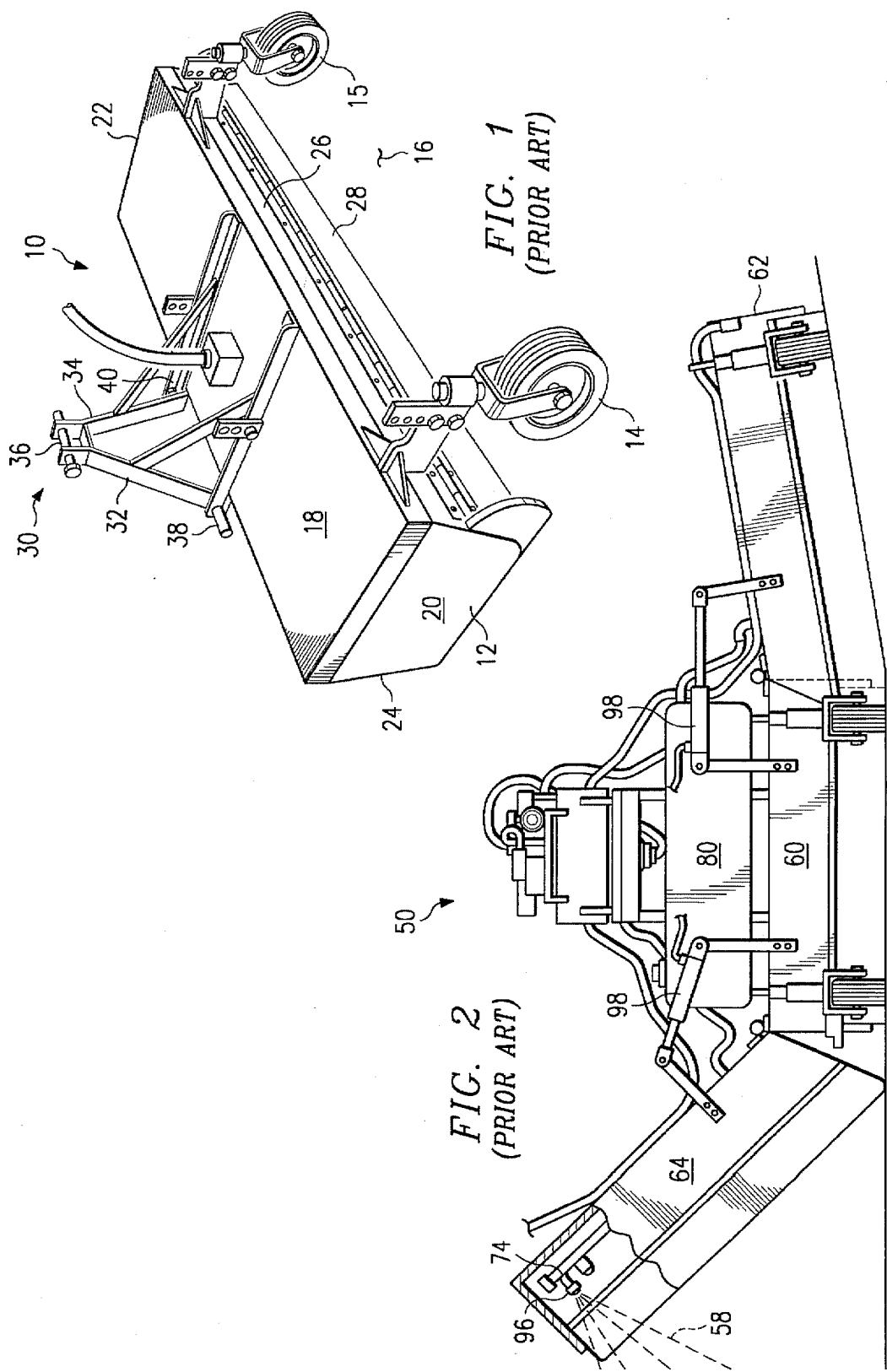

FOLDABLE SPRAYING SYSTEM

BACKGROUND OF THE INVENTION

1. Field of the Invention

The present invention relates to a system for spraying chemicals, and, more particularly, to a spraying system adapted for towable attachment to a motorized vehicle to facilitate the spray application.

2. History of Related Art

It is generally the practice when spraying chemicals such as herbicides and insecticides on plants, to eject the chemical in a fine mist upon the foliage being treated. Oftentimes however, winds cause the mist to drift away from the subject foliage before same is contacted. This creates two problems. First, the purpose of the spraying is frustrated in that the subject foliage is not treated. Secondly, the drift of the spray often contacts areas which are detrimentally affected by the spray. This twofold problem has been addressed by certain prior art spraying devices which have provided a spray bar enclosed and elongate housing adapted for ambulatory surface engagement. The spray from the spray bar is confined within the elongated housing during all wind conditions.

The use of these prior art spraying devices is effective in confining the mist to the enclosed container and preventing it from reaching areas which are detrimentally affected by the spray. The desirability, however, to increase the size or width of the strip which can be covered by the apparatus in a single application of the fluid mist has been the subject of considerable design attention. Increasing the size or width of a strip has limitations imposed by the need to transport a sprayer system between areas to be sprayed. To that end, the present invention includes an improved foldable sprayer system that enables the user to incorporate multiple outer sections to greatly increase the area subject to spraying, but facilitates transporting of the sprayer system between areas to be treated.

The effectiveness of the spraying system has also been the subject of design attention. One of the advantages of a drift free spraying system is the reduction in the amount of pesticide, herbicides, and/or fungicides that must be utilized. By reducing the quantity of such chemicals, the contamination of the environment is also greatly reduced. It would therefore be an advantage over the prior art to provide a foldable spraying system with improved capability of confining spray along an expanded area, and with spray effectiveness that can reduce the quantity of chemicals necessary for effective treatment. The present invention provides such a system by utilizing horizontally pivotable box type housings incorporating spray nozzles mounted in a frontal portion thereof for maximizing spray effectiveness with the least amount of chemical dispersed therefrom.

SUMMARY OF THE INVENTION

The present invention relates to a foldable spraying system having a carriage, an elongated bottomless box, and at least one spray nozzle mounted to the elongated bottomless box for spraying inside the elongated bottomless box. In one embodiment of the present invention, the bottomless box has a center section, at least one outer section being pivotally connected with the center section in a manner which allows the outer section to pivot horizontally between a forward unfolded position and a rearward folded position, and a means for locking the outer section in a forward unfolded position. In another embodiment the bottomless box has a center section, a first outer section pivotally connected to the center section, a second outer section pivotally connected to the center section, wherein the first and second outer section pivot between a forward unfolded position and a rearward folded position, including means for coupling the first outer section with the center section in the forward unfolded position, and including means for coupling the second outer section with the center section in the forward unfolded position.

In a further embodiment, the foldable spraying system includes at least one supporting wheel secured at a distant end of one of the outer sections for supporting the outer sections. In a further embodiment, at least one of the outer sections has a first section pivotally connected in a substantially vertical plane to a second section of the outer section, the first section of the outer section having the pivotal connection with the center section, and the second section of the outer section secured to the least one support wheel. In yet another further embodiment, both outer sections have a first section pivotally connected in a substantially vertical plane to a second section, the first sections of the outer sections having the pivotal connection with the center section, and the second sections secured to the corresponding support wheels. In yet a further embodiment, the at least one supporting wheel has shock absorbing means for facilitating the movement of the outer section over a surface to be sprayed. In yet another further embodiment, the at least one support wheel is adjustably mounted to the outer sections such that the height of the supporting wheel is adjustable relative to the elongated bottomless box.

In another further embodiment, the carriage includes at least one wheel being horizontally adjustable relative to the elongated bottomless box. In another further embodiment, the foldable spraying system includes a means for locking the outer sections in a rearward folded position. In another further embodiment, the elongated bottomless box includes a top panel, a front panel and a rear panel connected to the top panel, a front skirt depending downwardly from the front panel, and a rear skirt depending downwardly from the rear panel. In another embodiment, the foldable spraying system includes an outer extension elongated bottomless box being attached to the outer end of the outer sections of said elongated bottomless box, and at least one extension nozzle mounted to the outer extension elongated bottomless box for spraying therein. In yet another embodiment, the present invention includes a reservoir and a pump for receiving fluid from the reservoir and pumping the fluid to the at least one nozzle.

BRIEF DESCRIPTION OF THE DRAWINGS

For a more complete understanding of the present invention and for further objects and advantages thereof, reference may now be had to the following description taken in conjunction with the accompanying drawings in which:

FIG. 1 is a perspective view of a prior art invention illustrating a single towable spraying device in attachment to a vehicle;

FIG. 2 is a rear elevational view of a prior art foldable spraying system illustrating one of the outer wings thereof in a partially raised position and the outer section riding on an inclined surface while the center section is riding on a horizontal surface;

DETAILED DESCRIPTION

Figure 3:
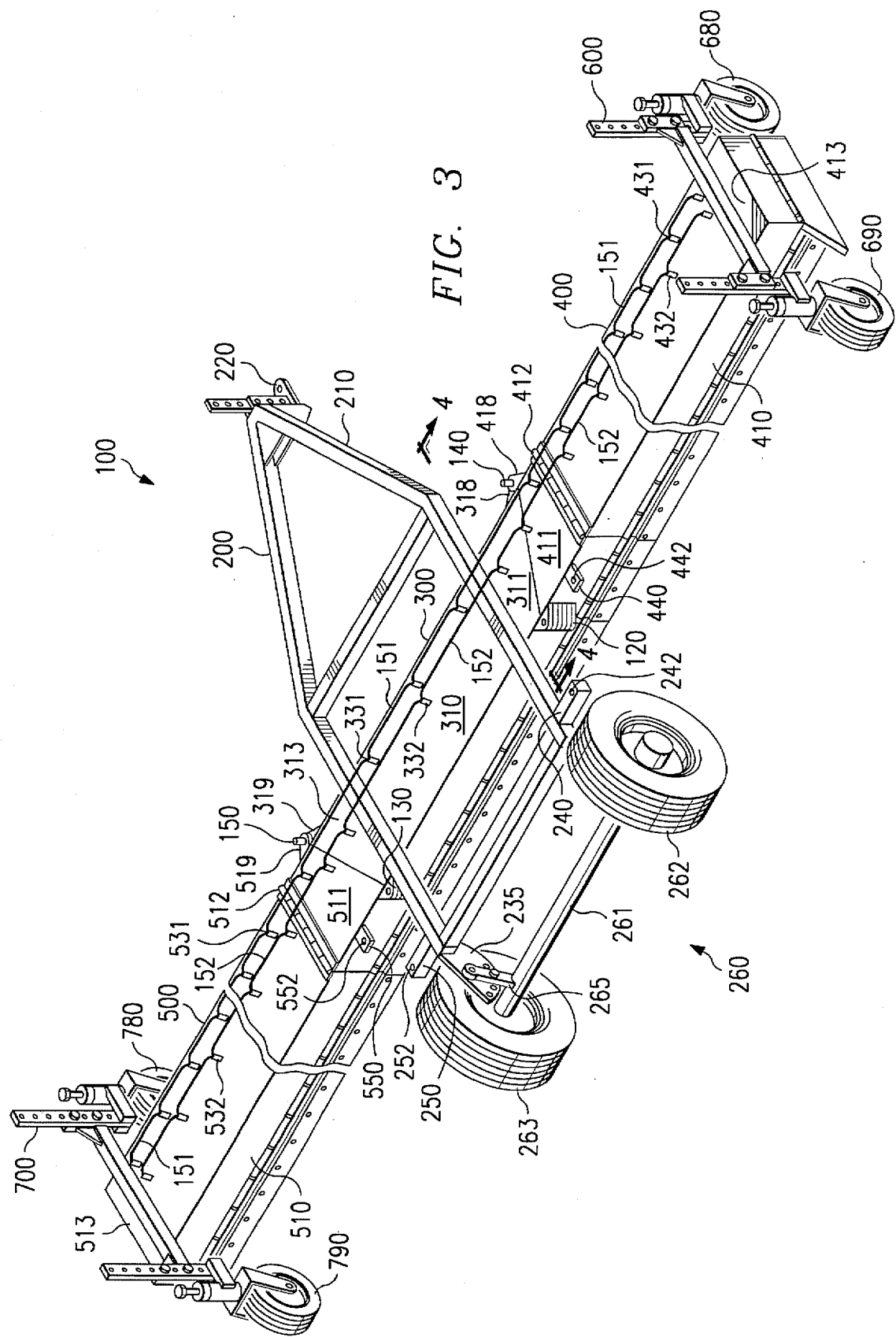
FIG. 3 is a perspective view of the foldable spraying system of the present invention.

Referring first to FIG. 1, there is shown a perspective view of prior art apparatus 10 for drift free spraying of chemicals such as herbicides, insecticides and/or pesticides in a confined area. A housing 12 of the apparatus 10 is preferably coupled to a conventional tractor (not shown) for towable operation over a surface 16 to be sprayed. The housing 12 is constructed of an elongated top wall 18 rigidly interconnecting opposite end walls 20 and 22, and fore and aft walls 24 and 26, respectively. Wheels 14 and 15 are provided outwardly of aft wall 26 for mobile support thereof. The bottom portion 28 of the housing 12 is open and is adapted for abuttingly facing surface 16 in close proximity thereto to confine spray thereon and prevent spray drift therefrom.

The housing 12 is preferably constructed of rigid sheet or plate metal, preferably welded one to the other and surface treated to resist the corrosive effects of the various types of conventional chemical sprays commonly utilized. A yoke assembly 30 is secured upon, and upstands from the top wall 18 of the housing 12 for coupling to the tractor (not shown) or similar vehicle adapted for towing ambulation thereof as will be discussed in more detail below. The yoke 30, of the articular embodiment shown herein, thus includes port and starboard A-frame struts 32 and 34, respectively, interconnected through an upper pivot frame 36. Lower port and starboard pivot frames 38 and 40 are pivotally connected to the base of the struts 32 and 34, respectively. An hydraulic system (not shown) of conventional design for vehicles such as tractors is preferably provided for vertical, rectilinear movement of the housing 12 of this particular embodiment. The three point support of the housing 12 through the respective A-frame struts 32 and 34 thus facilitates such bidirectional actuation atop the surface to be sprayed.

As described above, the prior art drift free foldable spraying system 10 shown therein is extremely effective in confining the spray mist to the enclosed container and preventing it from reaching areas which are detrimentally affected by the spray. As set forth above, however, it was found desirable to increase the size or width of the strip that could be covered by the apparatus and to provide other features thereto.

Referring now to FIG. 2, an improved unit is set forth and shown wherein a spraying system 50 has been constructed with center section 60, first outer section 62 and second outer section 64. The outer sections 62 and 64 are connected to the center section 60 by a hinge mechanism facilitating vertical pivoting therebetween. Each of the three sections 60, 62, and 64 are bottomless, rectangular, box type housings having spray bars 74 therein. A portion of the outer section 62 is cut away to illustrate the spray bar 74 and nozzle 96 extending therefrom for producing a spray 58 therewith. A fluid tank 80 is illustrated mounted atop the center section 60. The second outer section 64 is inclined at a slight angle to conform with the terrain and thus, the mist spray does not escape. It should be noted that such aspects are critical to effective mist control. FIG. 2 also illustrates the use of a hydraulic system 98 to raise the outer sections 62 and 64 to any desired height. While advantageous, this particular invention has certain inherent limitations by virtue of the need to vertically pivot the outer sections 62 and 64 upwardly about the center section 60. The hydraulic section 98 is both expensive and subject to structural limitations. For example, the length of the outer sections 62 and 64 is limited by various height, weight, and related fabrication and constructional aspects. The present invention addresses these prior art limitations by providing an improved spraying system which permits an advanced expansion of a drift free spraying system by utilizing a horizontally pivotal construction in a spray configuration which maximizes spray effectiveness with a minimum of added cost.

Referring now to FIG. 3, there is shown a perspective view of one embodiment of the present invention, illustrated as the foldable spraying system 100. The foldable spraying system 100 generally comprises a carriage 200, a center section 300, a first outer section 400, and a second outer section 500. The carriage 200 includes a frame 210, a mounting point illustrated herein as a hitch 220 attached to the forward portion of the frame 210, a first frame locking bracket 240 mounted to the rear starboard section of the frame 210, a second frame locking bracket 250 mounted to a rear port area of the frame 210, and a wheel assembly 260 attached to a rear section of the frame 210. The first and second frame locking brackets 240 and 250 have apertures 242 and 252, respectively. The wheel assembly 260 has an axle 261 upon which wheels 262 and 263 are rotatably mounted. A first pivot arm (not shown) and a second pivot arm 265 are attached to the axle 261. The first pivot arm and the second pivot arm 265 are pivotally mounted to a first wheel mounting bracket (not shown) and a second wheel mounting bracket 235. An aperture in the first pivot arm and an aperture in the second pivot arm 265 are positioned to align with apertures in the first wheel mounting bracket and apertures in the second wheel mounting bracket 235, respectively. The height of the frame 210 relative to the wheels 262 and 263, is determined by the pivotal position of the first pivotal arm and the second pivotal arm 265. Fasteners are disposed through the apertures in the pivot arms and the apertures in the wheel mounting brackets at holes which correlate to the desired height of the wheels 262 and 263 relative to the frame 210.

Referring still to FIG. 3, the center section 300 has a housing 310 which is mounted to the frame 210 of the carriage 200 by welding, fastening hardware, or the like. The housing 310 has a first end 311 and a second end 313. A first row of nozzles 331 are disposed in the housing 310 of the center section 300 and are connected by hoses 151. A second row of nozzles 332 are disposed in the housing 310 of the center section 300 and are connected by hoses 152.

Referring still to FIG. 3, a hinge 120 attaches the first end 311 of the housing 310 of the center section 300 to a first end 411 of a housing 410 of the first outer section 400. Likewise, a hinge 130 attaches the second end 313 of the housing 310 of the center section 300 to a first end 511 of a housing 510 of the second outer section 500. The hinges 120 and 130 allow the first and second outer sections 400 and 500 to rotate rearwardly in a horizontal plane. However, in a spraying position, a pin 140 passes through apertures in locking gussets 318 on the center section 300 and apertures in locking gussets 418 in the first outer section 400, thereby holding the first section in a forwardly extending spraying position. Likewise, in the spraying position, a pin 150 passes through apertures in locking gussets 319 on the center section 300 and apertures in locking gussets 519 in the second outer section 500, thereby holding the second outer section 500 in a forwardly extended spraying position. A travel locking bracket 440 is attached to the housing 410 and has an aperture 442. Likewise, a travel locking bracket 550 is attached to the housing 510 and has an aperture 552.

Still referring to FIG. 3, a first wheel assembly 600, having wheels 680 and 690, is attached to the first outer section 400 near an outer portion of a second end 413 of the housing 410. The wheel assembly 600 provides support for the extended length of the first outer section 400. Likewise, a wheel assembly 700 having wheels 780 and 790, is attached to the second outer section 500 near an outer portion of a second end 513 of the housing 510. The wheel assembly 700 provides support for the extended length of the second outer section 500.

Referring still to FIG. 3, a hinge 412 connects the first end 411 of the housing 410 with the second end 413 of the housing 410. The hinge 412 allows the second end 413 of the housing 410 to pivot in a vertical plane. Because the second end 413 of the housing 410 can pivot in a vertical plane, the second end 413 can pivot as the wheels 680 and 690 pass over unlevel ground. Likewise, a hinge 512 connects the first end 511 of the housing 510 with the second end 513 of the housing 510. The hinge 512 allows the second end 513 of the housing 510 to pivot in a vertical plane. Because the second end 513 of the housing 510 can pivot in a vertical plane, the second end 513 can pivot as the wheels 780 and 790 pass over unlevel ground.

Still referring to FIG. 3, a first row of nozzles 431 is disposed in the housing 410 and connected by hoses 151 to the first row of nozzles 331 in the center section 300. Also, a second row of nozzles 432 is disposed in the housing 410 and connected by hoses 152 to the second row of nozzles 332 in the center section 300. Likewise, a first row of nozzles 531 is disposed in the housing 510 of the second outer section 500 and connected by hoses 151 to the nozzles 331 of the center section 300. A second row of nozzles 532 is disposed in the housing 510 and connected by hoses 152 to the second row of nozzles 332 in the center section 300. In one embodiment, the first row of nozzles 331 is used to spray a first chemical on the vegetation, and the second row of nozzles 332 is used to spray a second chemical on the vegetation. The two types of chemicals can be any two types of chemicals used for vegetation, such as herbicides, insecticides, fertilizer, or the like. In another embodiment, the first row of nozzles 331 and the second row of nozzles 332 spray the same chemical.

Figure 4:
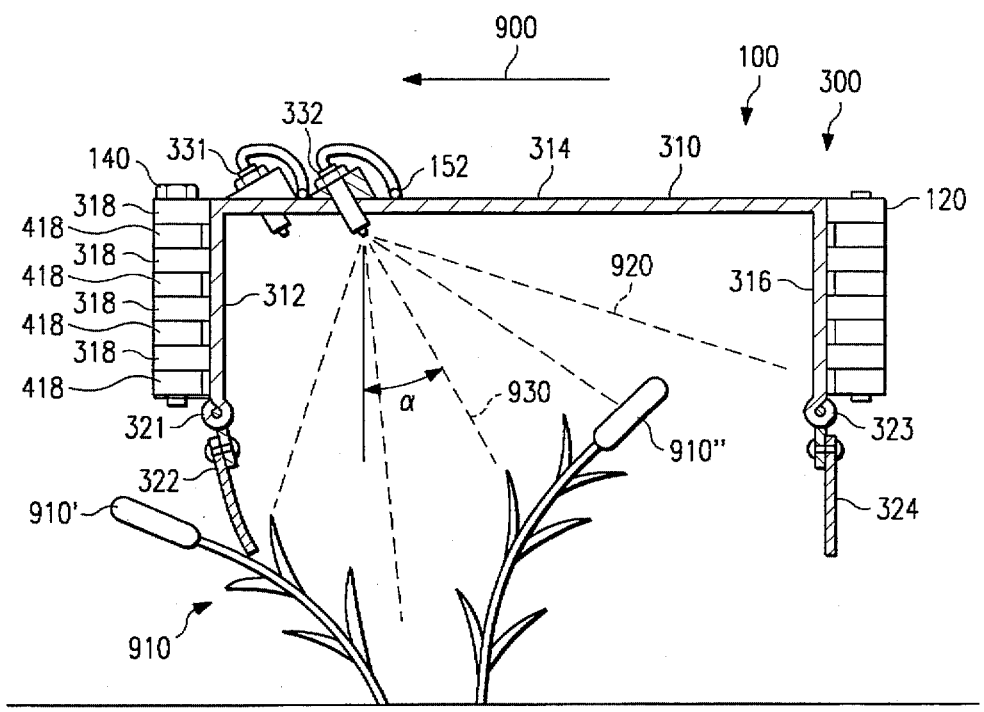
FIG. 4 is a side elevational cross sectional view of the housing from FIG. 3, taken along sectional lines 4—4 thereof.

Referring now to FIG. 4, there is shown a cross section of the center section 300 taken about section lines 4—4 in FIG. 3. Although FIG. 4 illustrates a cross section of the center section 300, the cross sections for the first outer section 400 and the second outer section 500 will incorporate the same features. As shown in FIG. 4, the center housing 310 includes a front panel 312, a top panel 314, and a rear panel 316. A front skirt 322 is secured to a bottom end of the front panel 312 by a hinge 321, and extends downwardly therefrom. A rear skirt 324 is secured to the rear panel 316 by a hinge 323, and extends downwardly therefrom. The front skirt 322 and the rear skirt 324 are preferably made from rubber. The locking gussets 318 are attached to the front panel 312 of the housing 310. The locking pin 140 extends downwardly through apertures in the looking gussets 318, and apertures in the locking gussets 418 of the first outer section 400. The first hinge 120 attaches to the rear panel 316 of the housing 310. The nozzle 332 extends downwardly through the top panel 314 of the housing 310. The hoses 152 connect the nozzle 332 with the other nozzles 332 and a supply source of the spraying medium (not shown).

Still referring to FIG. 4, it can be seen how the foldable spraying system 100 evenly distributes the spray on the vegetation 910. As the foldable spraying system 100 moves forward in the direction of travel 900, the front skirt 322 and the front panel 312 position the vegetation 910 in a forward facing position 910'. Because the vegetation 910 is held forward in a position 910' for a brief period of time, the spray nozzle 332 will coat the rear facing surfaces of the vegetation 910. Once the foldable spraying system 100 has advanced forward enough that the vegetation 910 is released by the front skirt 322 and the front panel 312, the vegetation 910 will spring backwards into a position 910". In the position 910", the vegetation is oriented such that the spray nozzles 332 can spray the forward surfaces of the vegetation 910. During the spraying operation of vegetation 910, the forward panel 312, the top panel 314, the rear panel 316, the forward skirt 322, and the rear skirt 324 present an enclosed housing which inhibits the influence of wind on the spray pattern 920 and the escape of overspray of the spraying medium.

Still referring to FIG. 4, the spraying nozzle 332 emits a spray pattern 920 having a center line 930. The position of the nozzle 332, and the angle $\alpha$ of the centerline 930 relative to the gravitational vertical, will be dependent on many factors such as the height of the vegetation, the height of the front panel 312 and the front skirt 322, the rate of travel for the foldable spraying system 100, and other factors. The spraying rate of the nozzle 332 will be dependent upon many factors such as the type of vegetation, the amount of coating required for the vegetation, the speed of travel for the foldable spraying system 100, and other similar factors. In one preferred embodiment the angle $\alpha$ is on the order of 17° rearward from the gravitational vertical line extending below the nozzles. The small angle of spray is found to provide an optimum coating of the front and back surfaces of the vegetation. In this preferred embodiment, the nozzles use a 200 mesh screen and are operated at 40 psi. At a ground speed of 4 mph, it has been found that the top fluid displacement for nozzles having the above-referenced characteristics is approximately 1.05 gallons per acre.

Still referring to FIG. 4, although the above features have been described in terms of the second row of nozzles 332, the first row of nozzles 331 will have corresponding components and operate in the same manner. Furthermore, although the above features have been described in terms of the center section 300 and its various components, the first outer section 400 and the second outer section 500 will have corresponding components and will operate in the same manner. However, the housing 410 of the first outer section 400 will also include an end panel 417 (shown in FIG. 5), and the housing 510 of the second outer section 500 will also include a similar end panel (not shown).

Referring now to FIG. 5, there is shown an end view of the first outer section 400 and the wheel assembly 600, partially cross sectioned to illustrate the components therein. The wheel assembly 600 includes a cross member 610 which is attached to the housing 410 of the first outer section 400. The cross member 610 has a flange 612 at a first end, and a flange 613 at the opposite end.

Still referring to FIG. 5, an adjustment member 620 has a vertical bar 621 with a plurality of holes 622 therein. Bolts 614 and 616 extend through mounting holes in the flange 612 of the cross member 610 and two of the plurality of holes 622 in the vertical bar 621, and thereby secure the vertical bar 621 of the adjustment member 620 to the flange 612 of the cross member 610. At a lower end of the adjustment member 620, a spindle bearing 623 is attached to the vertical bar 621.

Referring still to FIG. 5, a spindle 642 attaches to a wheel flange 646. The wheel 680 is mounted to the wheel flange 646 by an axle 648. The spindle 642 extends through the spindle bearing 623. A spindle collar 661 surrounds the spindle 642 above the spindle bearing 623. A spring 662 is trapped between the spindle collar 661 and a washer 664. Double locking nuts 666 and 668 engage threads 644 on the spindle 642 and prevent the washer 664 from coming off of the end of the spindle 642 due to the force of the spring 662.

Figure 5:
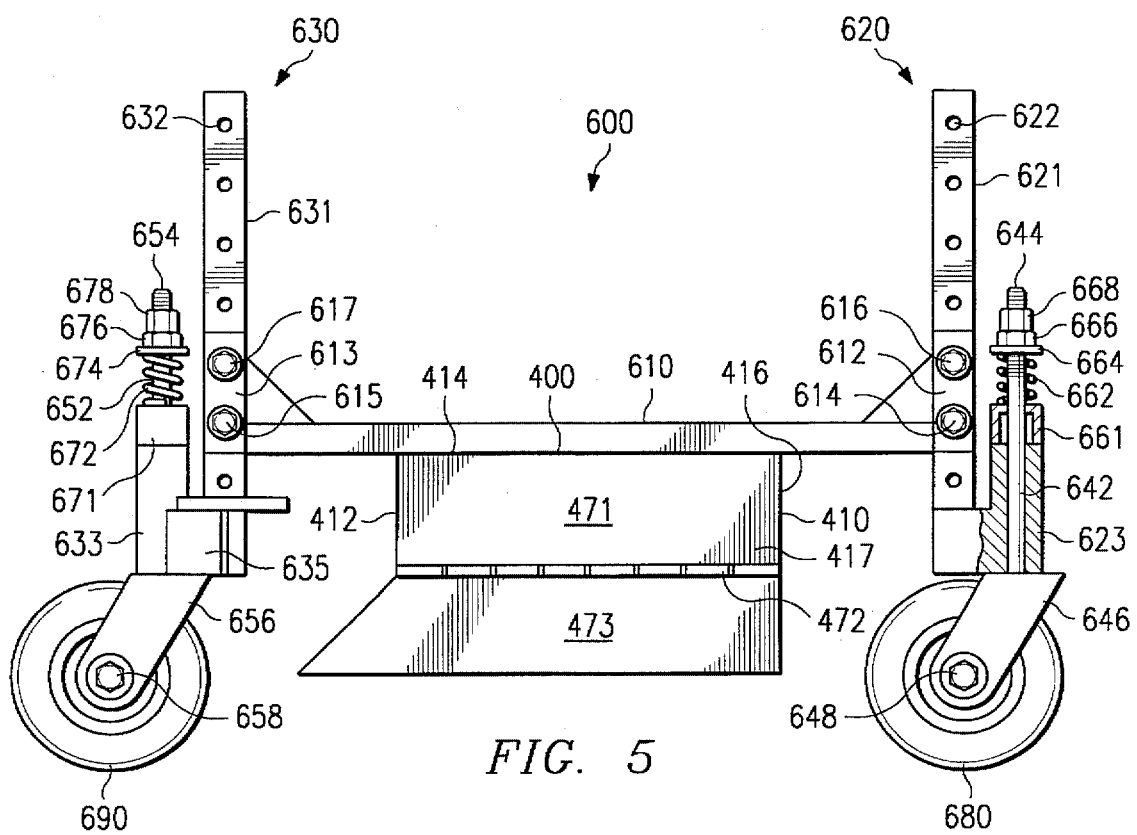
FIG. 5 is partial cross-sectional end view of one of the first outer section from FIG. 3, illustrating an outer wheel assembly.

Still referring to FIG. 5, it can be seen that the spindle bearing 623 allows the spindle 642, wheel flange 646, and wheel 680 to rotate with the direction of travel. The spindle collar 661, the spring 662, the washer 664, and the double locking nuts 666 and 668 provide shock absorption which allow the wheels to travel over an obstruction without rigid deflection in the wheel assembly 600. Also, the height of the first outer section 400 can be adjusted by securing the bolts 614 and 616 in various apertures 622 of the vertical bar 621.

Referring still to FIG. 5, the rear wheel 690 is held in position similar to the forward wheel 680. The rear wheel 690 is attached to a flange 656 by an axle 658. A spindle 652 is attached to the wheel flange 656 and extends through a spindle bearing 633 of an adjustment member 630. A spindle collar 671 is secured against the spindle bearing 633 and around the spindle 652 by a spring 672, washer 674, and the double locking nuts 676 and 678 engaging threads 654 of the spindle 652. Bolts 615 and 617 extend through the mounting holes in the flange 613 of the cross member 610 and two of a plurality of holes 632 in a vertical bar 631 of the adjustment member 630, and thereby secure the vertical bar 631 of the adjustment member 630 to the flange 613 of the cross member 610.

Figure 6:
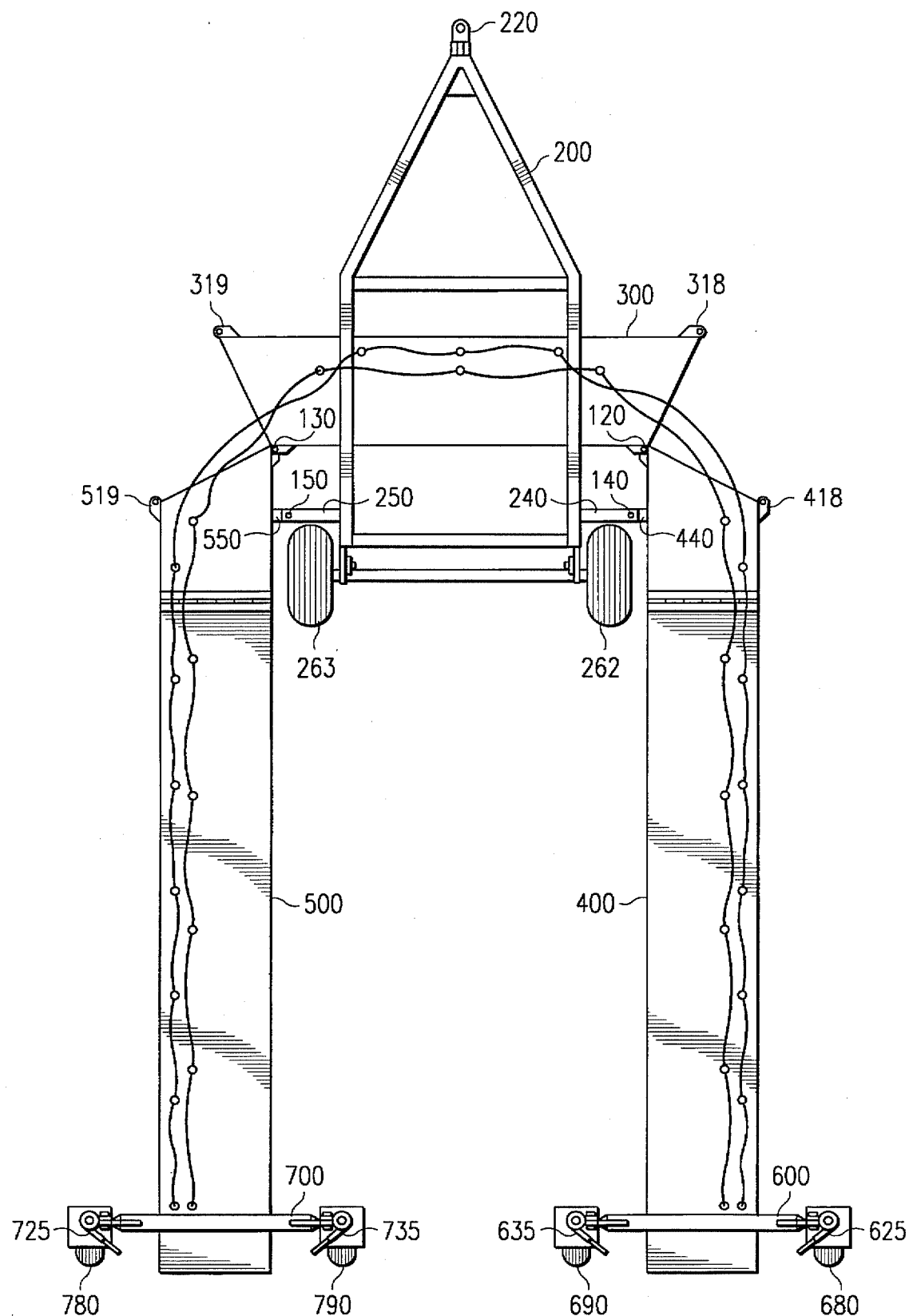
FIG. 6 is a top view of the system in FIG. 3 in a folded configuration.

Still referring to FIG. 5, a first locking device 635 is attached to the spindle bearing 633 of the adjustment member 630. The locking device 635 has a pin (not shown) which extends through an aperture (not shown) in the wheel flange 656 when the locking device 635 is in a locking position. Similarly, a second locking device (not shown) is attached to the spindle bearing 623 and has a pin which extends through an aperture in the wheel flange 646. In this manner, the wheels 680 and 690 can be locked in a travel position as illustrated in FIG. 6. Likewise, similar locking devices are attached to the spindle bearings of the wheel assembly 700 (shown in FIG. 6) for locking the wheels 780 and 790 (shown in FIG. 6) in a travel position.

Referring still to FIG. 5, the housing 410 of the first outer section 400 has an end panel 417 which includes an end wall 471, and an end skirt 473 connected to the end wall 471 by a hinge 472. The end wall 471 is attached to the front panel 412, the top panel 414, and the rear panel 416. Similarly, the housing 510 of the second outer section 500 (shown in FIG. 3) has an end panel (not shown) which includes an end wall which is attached to the front panel, the top panel, and the rear panel, and an end skirt connected to the end wall by a hinge.

Referring now to FIG. 6, there is shown the foldable spraying system 100 in a travel position. The first outer section 400 and the second outer section 500 have been rotated into a rear position about the first hinge 120 and the second hinge 130, respectively. The first pin 140 has been removed from the apertures in the gusset brackets 318 of the center section 300 and the gusset brackets 418 of the first outer section 400. In the rearward position of the first outer section 400, the aperture 442 (shown in FIG. 3) in the locking bracket 440 aligns with the aperture 242 (shown in FIG. 3) in the first frame locking bracket 240. The first locking pin 140, which was used to lock the first outer section 400 in a forward extended spraying position, is secured within the aperture 442 of the locking bracket 440 on the first outer section 400 and the aperture 242 in the first frame locking bracket 240. Locking brackets 625 and 635 are activated to lock the wheels 680 and 690 in a travel position. In this manner, the first outer section 400, is secured in a rearwardly extended travel position.

Referring still to FIG. 6, the second locking pin 150, has been removed from the apertures in the gusset brackets 319 of the center section 300, and the gusset brackets 519 of the second outer section 500. In the rearward travel position of the second outer section 500, the aperture 552 (shown in FIG. 3) in the locking bracket 550 aligns with the aperture 252 (shown in FIG. 3) in the second frame locking bracket 250. The second locking pin 150, which was used to secure the second outer section 500 in a forwardly extended spraying position, is positioned within the aperture 552 of the locking bracket 550 and the aperture 252 of the second frame locking bracket 250. Locking brackets 725 and 735 are activated to lock the wheels 780 and 790 in a travel position. In this manner, the second outer section 500 is secured in a rearwardly extending travel position. In the travel position, the foldable spraying system 100 can be towed by the hitch 220 of the carriage 200 and utilize wheels 262 and 263 of the carriage 200, wheels 680 and 690 of the wheel assembly 600, and wheels 780 and 790 of the wheel assembly 700 for traveling in a nonextended position for narrower pathways such as roads and the like.

Figure 7:
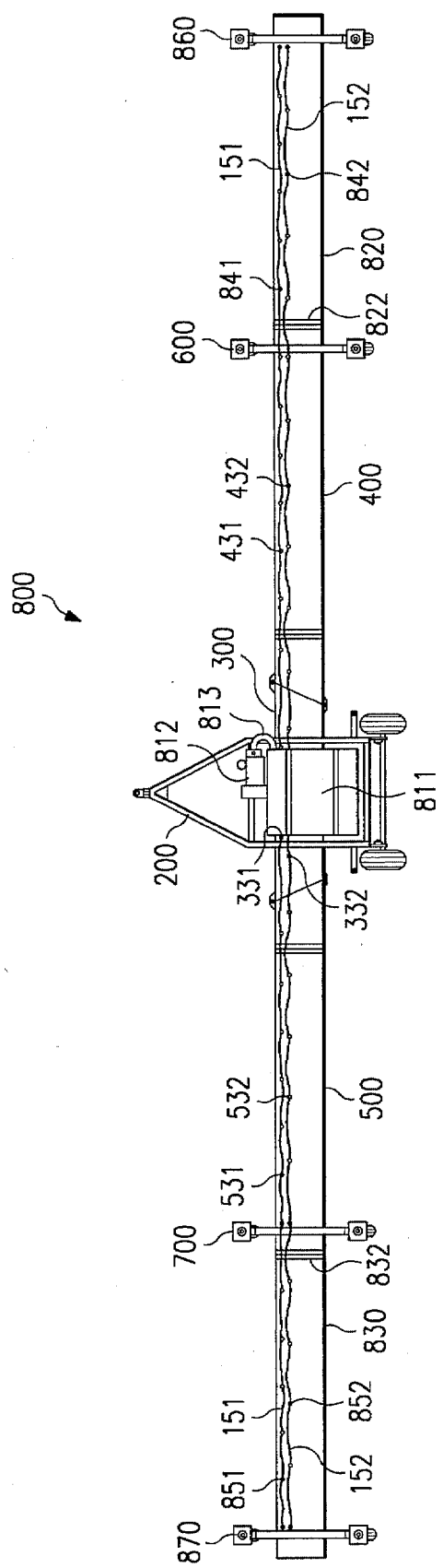
FIG. 7 is a top view of the system from FIG. 3, illustrating the attachment of extra outer sections thereon in accordance with the principles of the present invention.

Referring now to FIG. 7, there is shown another embodiment of the present invention illustrated as the extended foldable spraying system 800. The extended foldable spraying system 800 has the same components as the spraying system 100 in FIG. 3, of the carriage 200, the center section 300, the first outer section 400, the second outer section 500, the first outer wheel assembly 600 and the second outer wheel assembly 700. However, the extended foldable spraying system 800 includes a first outer extension wing 820 attached to the end of the first outer section 400, and a second outer extension section 830 attached to the second outer section 500. The first outer extension section 820 and the second outer extension 830 are mounted onto the first outer section 400 and the second outer section 500, respectively, preferably by vertically pivoting hinges 822 and 832, respectively. However, the first outer extension section 820 and the second outer extension 830 can be mounted onto the first outer section 400 and the second outer section 500, respectively, by bolts, fastening hardware, or the like. A wheel assembly 860, similar to the wheel assembly 600, is secured to the outer portion of the first outer extension section 820. Likewise, a wheel assembly 870, similar to the wheel assembly 700, is secured to an outer portion of the second outer extension section 830. The wheel assemblies 860 and 870 provide support to the first and second outer extension sections 820 and 830, respectively.

Still referring to FIG. 7, the first and second outer extension sections 820 and 830 have a first row of nozzles 841 and 851, respectively, which are connected by tubing or hoses 151. The tubing 151 connects the nozzles 841 and 851 with the nozzles 431 and 531 of the first and second outer sections 400 and 500, respectively, and with the nozzles 331 of the center section 300. Also, the first and second outer extension sections 820 and 830 have a second row of nozzles 842 and 852, respectively, which are connected by tubing or hoses 152. The tubing 152 connects the nozzles 842 and 852 with the nozzles 432 and 532 of the first and second outer sections 400 and 500, respectively, and with the nozzles 332 of the center section 300.

Referring still to FIG. 7, in one embodiment the present invention includes a tank 811, a pump 812, and a connecting hose 813. The tank 811 contains the spraying medium that is to be sprayed through the various nozzles in the spraying system 800. The tank 811 is connected to the pump 812 by the connecting hose 813. The pump 812 pumps the spraying medium through the hoses 151 and 152 to the various nozzles in the spraying system 800.

It is thus believed that the operation and construction of the present invention will be apparent from the foregoing description. For example, tension wires can be run from a front portion of the carriage to an outer area of the outer sections to help prevent the outer sections from folding back as the foldable spraying system is operated in a spraying mode. As another example, the nozzles can be connected in parallel, in series, by row, or in a selected pattern. While the method and apparatus shown or described has been characterized as being preferred it will be obvious that various changes and modifications may be made therein without departing from the spirit and scope of the invention as defined in the following claims.

What is claimed is:

1. A foldable spraying system for the discharge of fluid comprising:
   a carriage;
   an elongated bottomless box having a center section and at least one outer section, the center section being attached to said carriage for non-movement relative thereto and the outer section being pivotally connected to said center section, wherein the outer section pivots in a substantially horizontal plane between a forward unfolded position and a rearward folded position;
   means for locking the outer section in the forward unfolded position;
   means for locking the outer section in the rearward folded position; and
   at least one spray nozzle mounted to the elongated bottomless box, said at least one spray nozzle adapted to discharge the fluid at a select angle inside said elongated bottomless box.

2. The foldable spraying system according to claim 1, including at least one supporting wheel secured at a distant end of the outer section for supporting the outer section.

3. The foldable spraying system according to claim 2, further including said at least one supporting wheel having shock absorbing means for facilitating the movement of said outer section over a surface.

4. The foldable spraying system according to claim 2, further including said at least one supporting wheel being adjustably mounted to the outer section, wherein the height of the at least one supporting wheel is adjustable relative to the elongated bottomless box.

5. The foldable spraying system according to claim 2, wherein said outer section comprises a first section pivotally connected to a second section, wherein the second section of said outer section pivots with respect to the first section of said outer section in a substantially vertical plane, wherein said pivotal connection of said center section with said outer section is with the first section of said outer section, and wherein said at least one supporting wheel is secured to the second section of said outer section.

6. The foldable spraying system according to claim 5, further including said at least one supporting wheel having shock absorbing means for facilitating the movement of said outer section over a surface.

7. The foldable spraying system according to claim 5, further including said at least one supporting wheel being adjustably mounted to the outer section, wherein the height of the at least one supporting wheel is adjustable relative to the elongated bottomless box.

8. The foldable spraying system according to claim 1, wherein said carriage includes at least one wheel being horizontally adjustable relative to said elongated bottomless box.

9. The foldable spraying system according to claim 1, wherein said select angle comprises an angle of spray relative to the gravitational vertical on the order of 17°.

10. The foldable spraying system according to claim 1, including:
    an outer extension elongated bottomless box being attached to an outer end of the outer section of said elongated bottomless box; and
    at least one extension nozzle mounted to the outer extension elongated bottomless box, wherein said at least one extension nozzle sprays inside said outer extension elongated bottomless box.

11. The foldable spraying system according to claim 1, including:
    a reservoir; and
    a pump for receiving fluid from said reservoir and pumping said fluid to said at least one nozzle.

12. A foldable spraying system for the discharge of fluid comprising:
    a carriage;
    an elongated bottomless box having a center section, a first outer section, and a second outer section, the center section being attached to said carriage for non-movement relative thereto, the first outer section being pivotally connected to the center section, the second outer section being pivotally connected to the center section, wherein the first outer section and the second outer section pivot in a substantially horizontal plane between a forward unfolded position and a rearward folded position;
    means for locking the first outer section in the forward unfolded position;
    means for locking the second outer section in the forward unfolded position;
    means for locking the first outer section in the rearward folded position;
    means for locking the second outer section in the rearward folded position; and
    at least one spray nozzle mounted to the elongated bottomless box, said at least one spray nozzle adapted to discharge the fluid at a select angle inside said elongated bottomless box.

13. The foldable spraying system according to claim 12, including a first supporting wheel secured at a distant end of the first outer section for supporting the first outer section.

14. The foldable spraying system according to claim 13, further including said first supporting wheel having shock absorbing means for facilitating the movement of said first outer section over a surface.

15. The foldable spraying system according to claim 13, further including said first supporting wheel being adjustably mounted to said first outer section, wherein the height of the first supporting wheel is adjustable relative to the elongated bottomless box.

16. The foldable spraying system according to claim 13, wherein said first outer section comprises a first section pivotally connected to a second section, wherein the second section of the first outer section pivots with respect to the first section of said first outer section in a substantially vertical plane, wherein said pivotal connection of said center section with said first outer section is with the first section of said first outer section, and wherein said first supporting wheel is secured to the second section of said first outer section.

17. The foldable spraying system according to claim 16, further including said first supporting wheel having shock absorbing means for facilitating the movement of said first outer section over a surface.

18. The foldable spraying system according to claim 16, further including said first supporting wheel being adjustably mounted to said first outer section, wherein the height of the first supporting wheel is adjustable relative to the elongated bottomless box.

19. The foldable spraying system according to claim 13, including a second supporting wheel secured at a distant end of the second outer section for supporting the second outer section.

20. The foldable spraying system according to claim 19, further including said second supporting wheel having shock absorbing means for facilitating the movement of said second outer section over a surface.

21. The foldable spraying system according to claim 19, further including said second supporting wheel being adjustably mounted to said second outer section, wherein the height of the second supporting wheel is adjustable relative to the elongated bottomless box.

22. The folding spraying system according to claim 19, further comprising:

said first outer section comprises a first section pivotally connected to a second section, wherein the second section of said first outer section pivots with respect to the first section of said first outer section in a substantially vertical plane, wherein said pivotal connection of said center section with said first outer section is with the first section of said first outer section, and wherein said first supporting wheel is secured to the second section of said first outer section; and said second outer section comprises a first section pivotally connected to a second section, wherein the first section of the second outer section pivots with respect to the first section of the second outer section in a substantially vertical plane, wherein said pivotal connection of said center section with said second outer section is with the first section of said second outer section, and wherein said second supporting wheel is secured to the second section of said second outer section.

23. The foldable spraying system according to claim 22, further comprising:

said first supporting wheel having shock absorbing means for facilitating the movement of said first outer section over a surface; and said second supporting wheel having shock absorbing means for facilitating the movement of said second outer section over a surface.

24. The foldable spraying system according to claim 22, further comprising:

said first supporting wheel being adjustably mounted to said first outer section, wherein the height of the first supporting wheel is adjustable relative to the elongated bottomless box; and said second supporting wheel being adjustably mounted to said second outer section, wherein the height of the second supporting wheel is adjustable relative to the elongated bottomless box.

25. The foldable spraying system according to claim 12, wherein said carriage includes at least one wheel being horizontally adjustable relative to said elongated bottomless box.

26. The foldable spraying system according to claim 12, wherein said select angle comprises an angle of spray relative to the gravitational vertical on the order of 17°.

27. The foldable spraying system according to claim 12, wherein said elongated bottomless box includes a top panel, a front panel and a rear panel connected to the top panel, a front skirt depending downwardly from the front panel, and a rear skirt depending downwardly from the rear panel.

28. The foldable spraying system according to claim 12, including:

a first outer extension elongated bottomless box being attached to an outer end of the first outer section of said elongated bottomless box; and at least one first extension nozzle mounted to the first outer extension elongated bottomless box, wherein said at least one first extension nozzle sprays inside said first outer extension elongated bottomless box.

29. The foldable spraying system according to claim 28, including:

a second outer extension elongated bottomless box being attached to an outer end of the second outer section of said elongated bottomless box; and at least one second extension nozzle mounted to the second outer extension elongated bottomless box, wherein said at least one second extension nozzle sprays inside said second outer extension elongated bottomless box.

30. The foldable spraying system according to claim 12, including:

a reservoir; and a pump for receiving fluid from said reservoir and pumping said fluid to said at least one nozzle.

* * * * *

UNITED STATES PATENT AND TRADEMARK OFFICE
CERTIFICATE OF CORRECTION

PATENT NO. : 5,673,854
DATED : October 7, 1997
INVENTOR(S) : Leon Kinder

It is certified that error appears in the above-indentified patent and that said Letters Patent is hereby corrected as shown below:

Col. 5, ln. 61, delete "looking", insert --locking--.

Signed and Sealed this

Thirteenth Day of January, 1998

Attest:

BRUCE LEHMAN

Attesting Officer     Commissioner of Patents and Trademarks